United States Patent
Sun et al.

(10) Patent No.: US 7,060,929 B2
(45) Date of Patent: Jun. 13, 2006

(54) SHEET-TO-TUBE RESISTANCE SPOT WELDING USING SERVO GUN

(75) Inventors: Peter C. Sun, Rochester Hills, MI (US); Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 137 days.

(21) Appl. No.: 10/785,793

(22) Filed: Feb. 24, 2004

(65) Prior Publication Data

US 2005/0184031 A1    Aug. 25, 2005

(51) Int. Cl.
*B23K 11/10* (2006.01)
(52) U.S. Cl. .................. 219/86.7; 219/59.1; 219/117.1
(58) Field of Classification Search ............. 219/86.51, 219/86.7, 59.1, 117.1
See application file for complete search history.

(56) References Cited

U.S. PATENT DOCUMENTS

| | | | |
|---|---|---|---|
| 2,313,941 A * | 3/1943 | Humphrey et al. | ........... 219/89 |
| 4,480,166 A | 10/1984 | Leech | |
| 4,949,895 A | 8/1990 | Sugiyama et al. | |
| 5,720,092 A | 2/1998 | Ni et al. | |
| 5,818,008 A * | 10/1998 | Cecil | ........................ 219/110 |
| 6,089,617 A | 7/2000 | Craig et al. | |
| 6,302,478 B1 | 10/2001 | Jaekel et al. | |
| 6,373,021 B1 | 4/2002 | Wang et al. | |
| 6,459,064 B1 * | 10/2002 | Trubert | ...................... 219/85.1 |

* cited by examiner

*Primary Examiner*—Len Tran
(74) *Attorney, Agent, or Firm*—Kathryn A. Marra

(57) ABSTRACT

A method of spot welding a sheet overlapped to a tube with a servomotor-driven electrode applying a clamping force to the sheet. Over a first clamping time interval, the clamping force is increased to a first force level, at which point a welding current is applied to weld the sheet and tube together for a welding time interval. The first force level is maintained for a second clamping time interval, after which the clamping force is reduced to a second force level over a third clamping time interval and is maintained for a fourth clamping time interval. The welding current is removed upon expiration of the welding time interval and the clamping force is simultaneously reduced over a fifth clamping time interval, after which the electrode is disengaged from the sheet. The reduction in clamping force during the welding cycle reduces cracking of the spot weld.

18 Claims, 2 Drawing Sheets

SHEET-TO-TUBE RESISTANCE SPOT WELDING USING SERVO GUN

TECHNICAL FIELD

This invention pertains to resistance spot welding of a galvanized steel sheet to a galvanized steel tube to create a welded assembly. More specifically, this invention relates to improvements in resistance spot welding of such galvanized steel workpieces using a servomotor-driven welding gun to avoid crack formation in the welded assembly.

BACKGROUND OF THE INVENTION

Automotive vehicle body assemblies may involve, for example, the attachment of a formed galvanized steel sheet part to a hydroformed galvanized steel tubular part. A copper electrode for resistance spot welding is pressed against the sheet member of the tube/sheet assembly at an intended weld site with a copper backup electrode supporting the opposite side of the tube member. In a production operation, several spot welds in a pattern may be required to suitably attach the sheet to the tube. And in a vehicle body assembly, several sheets may be welded to several tubes. Such operations now typically involve a digitally controlled welding machine setup in which robot arms, for example, carry welding guns comprising a resistance spot welding electrode and an opposing backup electrode and are moved around an assembly to form the welds. At each sheet/tube weld location the welding gun clamps on the galvanized surfaces for good electrical contact. Pneumatic pressure is usually supplied to the gun for this clamping force. A high amperage welding current is momentarily passed between the copper electrodes through the sheet layer and around the tube at the weld location to briefly fuse the tube/sheet interface to form a weld nugget.

Steel is a material of choice for sheet and tube body structures because of its formability and weldability. And preferably the steel is galvanized for corrosion resistance. Current materials are quite strong and relatively thin sheets and tubes can be used in these applications. However, it has proven difficult to produce good spot welds between such sheets and tubes by the described process on galvanized steel because cracks form at the weld sites, particularly in the sheet above the weld nugget.

The cracks are primarily caused by localized high tensile stress at the weld joint and are exacerbated by the presence of the zinc element in the galvanized steel. Because the tube is typically a relatively thin-walled member, when the upper electrode presses against the sheet and tube, the tube and sheet tend to flex. Such flexure of the sheet and tube results in the high tensile stress at the weld joint and, thus, presents a unique problem in the art of spot welding. Also, during the welding cycle, the zinc element enters into the grain boundaries of iron within the galvanized steel and remains in a liquid state at a temperature well below the freezing or solidifying point of the steel. After the heating cycle, but before the electrode force is released, the liquid zinc possesses little strength and, consequently, provides little resistance to cracking. As a result it has been difficult to spot weld sheet-to-tube galvanized steel assemblies.

It is an object of this invention to provide a resistance spot welding method for joining galvanized steel sheets to galvanized steel tubes.

SUMMARY OF THE INVENTION

This invention provides a method for reducing or eliminating cracks in spot welds between sheet-to-tube structures composed of galvanized steel. The method is based on the need, now understood, to carefully control and alter the force applied, during welding current flow, between a main electrode applied to the sheet at the weld site and the counter electrode applied to the backside of the tube opposite the weld site. For this reason, it is preferred that the main spot weld electrode be actuated with a servomotor for more precise control of the force during weld nugget formation. Servomotors are available for use in electrical resistance welding applications in combination with electrical/electronic welding controllers for good and reproducible control of each welding cycle.

A sheet against tube assembly is located between the opposing electrodes and the electrodes are moved toward each other to grip the workpieces therebetween. The welding current, typically AC or rectified AC, at a level of, for example, six to fifty kilo amperes is passed between the electrodes through the sheet and around the tube near the weld location. Before current flow is commenced, the servomotor is signaled to advance the electrode bearing against the sheet surface to apply force at a first level, e.g. 350 pounds force. Then a welding current is applied. The resistive steel sheet and tube wall, each typically about one to two millimeters thick, are immediately heated and softened by the current flow and the electrode force makes an indentation in the sheet surface and tends to flex the sheet and tube wall. Within a small fraction of a second, e.g. 100 milliseconds, molten metal is formed at the sheet/tube interface. At about this time the servomotor is signaled to retract the spot weld electrode slightly to reduce the electrode force (to for example, 200 pounds force) on the sheet during the remainder of the period of current flow, perhaps an additional 100 ms. After current flow is terminated, the electrode displacement and force may be reduced further as heat flows from the molten metal at the sheet/tube boundary and a solid weld nugget forms.

The reduction in spot weld electrode force and displacement into the sheet surface is found to dramatically reduce the incidence of cracking in or around the spot weld nugget. Although the zinc element from the galvanized layers at the sheet/tube interface may enter the weld material, the reduction of electrode force and the reduced deflection of the sheet and tube results in substantially crack-free welds in the galvanized sheet-to-tube assembly. The weld sequence typically requires only a fraction of a second to complete and can be reliably repeated to form several welds between a given sheet/tube assembly or in many such assemblies.

In order to establish the times of the respective electrode force applications in each weld cycle it is usually easiest to conduct a few experiments on prototype sheet/tube assemblies like those to be welded in an ongoing production operation. Accordingly, the welding current level, duration of welding current passage and the clamping force levels are established. Once established and verified during a short trial run with production equipment, the parameters for spot welding of galvanized steel sheet-to-tubes can be accomplished with minimal cracked weld nuggets.

Other objects and advantages of the invention will become more apparent from a detailed description of preferred embodiments which follows in this specification.

BRIEF DESCRIPTION OF THE DRAWINGS

These and other features and advantages of the invention will become apparent upon reading the detailed description in combination with the accompanying drawings, in which.

DESCRIPTION OF A PREFERRED EMBODIMENT

Figure 1:
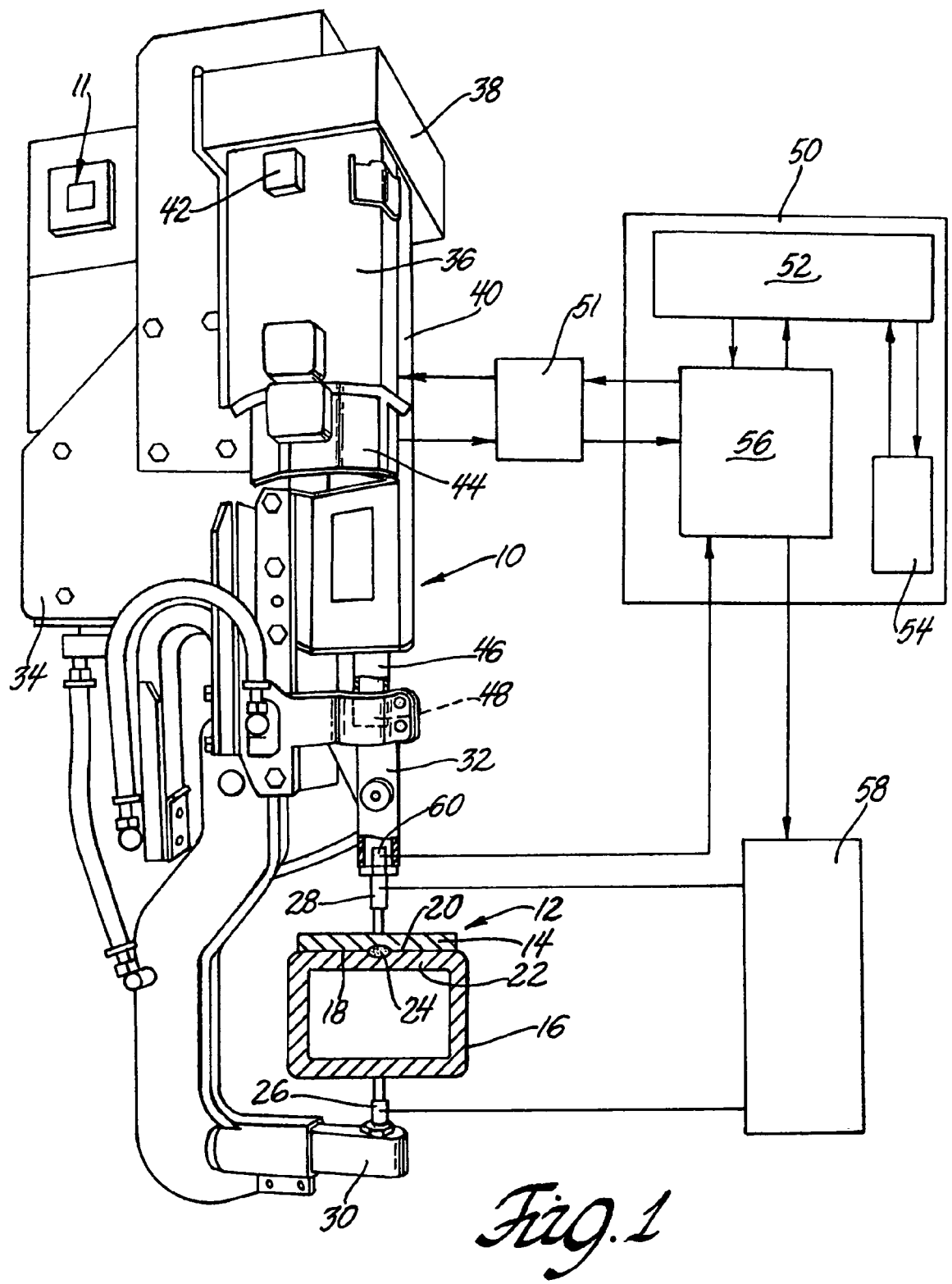
FIG. 1 is a schematic representation of an exemplary welding apparatus for use with a method according to one embodiment of the present invention.

Referring now to the drawing Figures, there is shown in FIG. 1 an exemplary resistance spot-welding apparatus 10 for use in accordance with a method of the present invention. The spot-welding apparatus 10 may, in general, be any commercially available spot-welding gun, but one that is presently adapted to include novel features according to the present invention as will be discussed more fully herein below. Accordingly, many of the standard details of the spot-welding apparatus 10 are well known and need not be explored herein. The spot-welding apparatus 10 includes an attachment point 11 that connects, as an end-effector of sorts, to the end of a robot arm of a robot (not shown) as is well known in the art of spot welding.

The spot welding apparatus 10 is particularly applicable to welding a sheet-to-tube assembly 12 including a sheet 14 and a hydroformed tube 16. For example, the sheet-to-tube assembly 12 may be a portion of a vehicle chassis frame positioned at a station along an assembly line, wherein the sheet 14 is a body panel that is being welded to a longitudinal frame rail as the tube 16. Accordingly, a robot (not shown) articulates and positions the apparatus 10 as shown in a vertical position with respect to the horizontally oriented assembly 12.

For purposes of experimental validation of the present invention, the tube 16 has a wall thickness of 1.5 mm and is composed of hot-dipped galvanized steel. The sheet 14 is 1.0 mm in thickness and is also composed of hot-dipped galvanized steel. It is contemplated, however, that the sheet 14 and/or tube 16 could alternatively be composed of bare steel, i.e. not galvanized. As shown, the sheet 14 is placed atop the tube 16 such that a faying surface 18 of the sheet 14 contacts a faying surface 20 of a welded or adjacent wall 22 of the tube 16. As will be described in more detail below, the welding apparatus 10 is capable of producing a weld nugget 24 connecting the sheet 14 and tube 16 at a weld site at the faying surfaces 18, 20 thereof.

The sheet-to-tube assembly 12 is clamped between opposing electrodes defined by a stationary electrode 26 and a traversable electrode 28. Both electrodes 26, 28 are preferably B-nose electrodes and are supported by electrode holders 30, 32, which are in turn supported by a C-shaped welding gun frame 34. The electrode holder 30 of the stationary electrode 26 is fixed to the welding gun frame 34, whereas the electrode holder 32 of the traversable electrode 28 is slidably mounted to the welding gun frame 34.

The slidable electrode holder 32 is traversable so as to increase or decrease the distance between the tips of the electrodes 26, 28. The slidable electrode holder 32 is traversed back and forth by means of a powertrain that is defined by a servomechanism, servomotor 36, or the like, and a drive train, which is defined by a rotational transfer device, gearbox 38, or the like, and a linear motion actuator, ball screw device 40, or the like. The servomotor 36 is preferably a FANUC model ☐M6/3000 that includes a brake 42 and an encoder 44. The ball screw device 40 includes a driveshaft 46 that is connected to a socket portion 48 of the slidable electrode holder 32. As electrical current is supplied to the servomotor 36, rotational motion of the servomotor 36 is translated into linear motion of the driveshaft 46 by virtue of the gearbox 38 and ball screw device 40. Accordingly, the servomotor 36 may be actuated so as to traverse the slidable electrode holder 32, adjust the distance between the electrodes 30, 32, and thereby apply a clamping force to the sheet-to-tube assembly 12.

In this way, the servomotor 36 is actuated by a welding control module 50 via a robot controller 51 that is used to control movement of the robot (not shown) that is connected to the spot-welding apparatus 10 and to facilitate operation of the servomotor 36. The welding control module 50 is capable of monitoring various welding parameters and producing various welding commands. In general, welding control modules are known to those of ordinary skill in the art of resistance spot welding. The present invention, however, makes novel and unobvious use of a welding control module and servomotor-driven drive train to minimize crack formation in spot welds. The welding control module 50 includes a controller 52, memory 54, and interface electronics 56. The controller 52 may be configured to process control logic that provides the functionality for the welding apparatus 10. In this respect, the controller 52 may encompass a microprocessor, a micro-controller, an application specific integrated circuit, and the like. The controller 52 may be interfaced with the memory 54 which is configured to provide storage of computer software that provides the instructions or functionality of the welding apparatus 10 and that may be executed by the controller 52. The memory 54 may also be configured to provide a temporary storage area for data input received by the control module 50 from sensors, a host device, such as a computer, server, workstation, and the like. The memory 54 can be RAM, ROM, EPROM, and the like. The interface electronics 56 may conform to protocols such as RS-232, parallel, small computer system interface, universal serial bus, and the like.

In any case, the controller 52 communicates with the servomotor 36 via the interface electronics 56 and robot controller 51. The controller 52 sends control signals to the servomotor 36 that ultimately relate to electrode force and displacement. Conversely, the controller 52 receives position and torque feedback from the encoder 44 of the servomotor 36. The servomotor 36 may suitably include a torque meter (not shown) to supply such feedback. The encoder 44 outputs data representative of the rotational position of the servomotor 36, which can be correlated to a known linear position of the drive train driveshaft 46, slidable electrode holder 32, and traversable electrode 28, as is known in the art. There may also be a correlation between the displacement of the servomotor and the electrode force applied by the servo gun, in which case the servomotor feedback may output data representative of such electrode force. Additionally, or alternatively, the encoder 44 may also output servomotor torque data that is correlated to and, thus, representative of the traversable electrode force.

The interface electronics 56 also communicate with a transformer or welding power supply 58 so as to send output commands thereto, such as desired current levels and welding time. The welding power supply 58 is preferably set to apply a constant level of about between six and fifty kiloamperes, but preferably about 14.5 kiloamperes, of alternating current or rectified alternating current and about 1 to 480 volts at about a 60 Hz frequency. In turn, the welding power supply 58 is connected to the electrodes 26, 28 to supply welding current thereto.

Finally, in addition to the force feedback signals generated by the servomotor, the interface electronics 56 may also communicate with a sensor or load cell 60 to measure actual clamping forces imposed by the powertrain-driven electrode 28 on the sheet-to-tube assembly 12. The load cell 60 is preferably positioned between the traversable electrode 28 and electrode holder 32.

The method of the present invention will now be described in more detail with reference to the above-described apparatus of FIG. 1, which is but one of many possible examples of apparatus for carrying out the method. The sheet 14 is assembled to the tube 16 so as to overlap the faying surfaces 18, 20 thereof and establish the sheet-to-tube assembly 12. The sheet-to-tube assembly 12 is then relatively positioned between the opposed welding electrodes 26, 28, such as by a robot (not shown) having the welding apparatus 10 attached to one end thereof. The welding apparatus is then operated as discussed below in reference to FIGS. 1 and 2.

Figure 2:
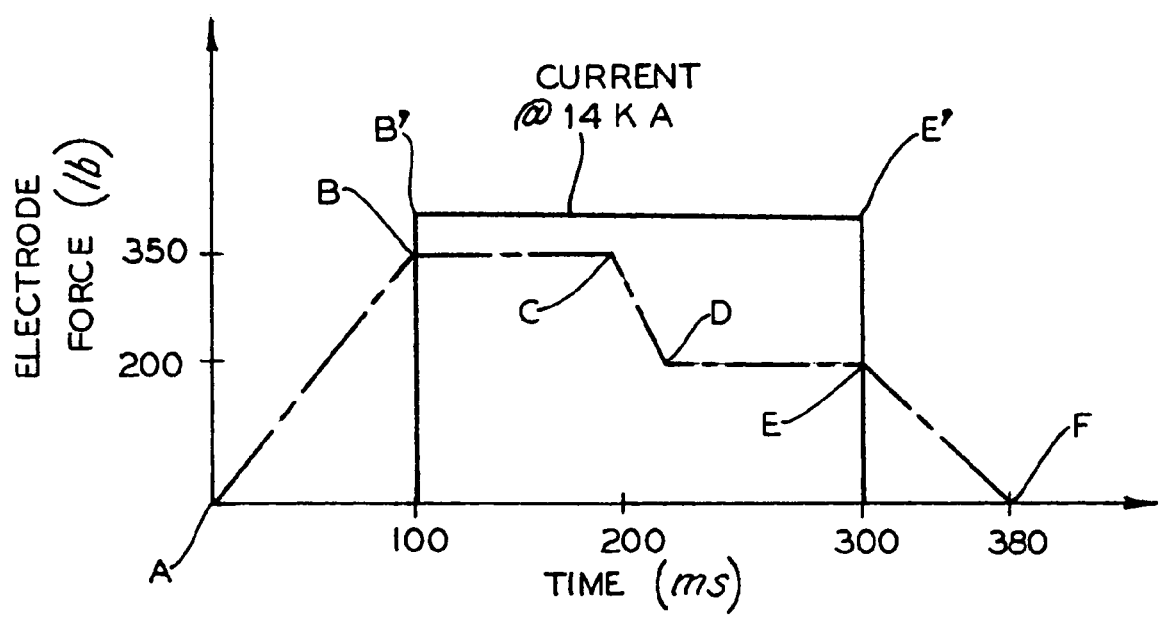
FIG. 2 is a graphical representation of a welding schedule in accordance with an embodiment of the present invention.

FIG. 2 depicts a plot of a welding schedule in accordance with experimental validation of an embodiment of the method of the present invention. Electrode clamping force is plotted along the ordinate in pounds force (1$b$), and cycle time is plotted along the abscissa in milliseconds (ms). A plot of welding current is overlaid on the force vs. time plot and is reported in kiloamperes.

The resistance spot welding process has several time intervals. In a first time interval from point A to point B of FIG. 2, the process includes two stages. The first stage begins by merely contacting or engaging the traversable electrode 28 against the sheet 14, represented by point A. This is accomplished by the controller 52 sending an advance servomotor command to the servomotor 36 through the interface electronics 56. Accordingly, the servomotor 36 rotates to drive the drive train and ultimately drive the traversable electrode 28 in a general direction toward the stationary electrode 26 until the traversable electrode 28 contacts the assembly 12. In a second stage, the controller 52 sends a further advance servomotor command to the servomotor 36 so as to apply a clamping force on the sheet-to-tube assembly 12 to initiate the squeeze-cycle from point A to point B. According to a predetermined schedule that may be stored in the memory 54, the controller 52 gradually increases the servomotor current. Simultaneously, the servomotor 36 sends torque feedback signals back to the controller 52. The controller 52 can resolve these torque signals into estimated electrode forces being applied by the traversable electrode 28. Alternatively, or additionally, the controller 52 can monitor the actual application of clamping force via the load cell 60 through the interface electronics 56.

The controller is programmed so as to achieve a predetermined first force level, such as 350 lbs, within the first clamping time interval, such as 100 ms at point B. Once the actual clamping force reaches the first force level, then the controller 52 signals the servomotor 36 to stop advancing and maintain the desired first force level for a second clamping time interval from point B to point C, such as about 100 ms. Simultaneously, upon achieving the first force level at point B of FIG. 2, the controller 52 signals the welding power supply 58 to initiate weld current between the electrodes 26, 28 to begin a 200 ms welding cycle, which represents 12 cycles of the 60 Hz welding power supply 56. This high amperage welding current is, for example, a constant 14.0 kA as shown, and is momentarily passed between the copper electrodes 26, 28 for a predetermined welding time interval, such as 200 ms. The welding current passes through the sheet 14 and around the tube 16 and encounters impedance at the faying surfaces 18, 20 thereof. The high amperage current and high resistance at the faying surface create intense heating at the faying surfaces 18, 20 to eventually liquefy the steel that is present at the faying surfaces 18, 20 and generally in line between the electrodes 26, 28 to form the weld nugget 24. The intense heating not only creates localized liquification of the steel, but also softens the steel in a wider area around the weld nugget 24. Because of the thin-walled construction of the tube 16, the sheet 14 and adjacent wall 22 of the tube 16 tend to deflect under the pressure applied by the traversable electrode 28. And, when the steel softens in this area, the sheet 14 and adjacent wall 22 of the tube 16 tend to deflect even further under the clamping force applied by the traversable electrode 28.

To minimize such deflection, and weld cracking created thereby, the present invention involves reducing the clamping force approximately in the middle of the welding cycle just before the steel at the weld site liquefies. The clamping force is reduced to a second force level, such as 200 lbs, over a third clamping time interval from point C to point D. The third clamping time interval should be as short as possible and is the difference between the welding time interval from point B' to point E', and the sum of the second clamping time interval point B to point C and a later fourth clamping time interval point D to point E, which is discussed below. The reduction in clamping force may be accomplished in any manner, but is preferably accomplished in several steps. For example, the controller 52 commands the servomotor brake 42 to be applied to halt rotation of the servomotor 36 and linear advancement of the traversable electrode 28. Then, the controller 52 commands the servomotor 36 to reverse, and release the brake 42, so as to retract the traversable electrode 28 to further reduce the clamping force. Finally, the controller 52 monitors the decreasing clamping force via the load cell 60 and/or servomotor torque feedback. And, once the clamping force reaches the second force level, the controller 52 commands the servomotor 36 to stop reversing, and the brake 42 is again applied to minimize overtravel of the electrode 28 due to inertia thereof. Simply put, over time interval C–D, the distance between the electrodes 26, 28 is increased so as to alleviate the compressive force applied by the welding electrodes 26, 28 on the sheet-to-tube assembly 12.

Thereafter, the clamping force is maintained at the reduced second force level for a fourth clamping time interval from point D to point E, such as 100 ms. Over this time interval, the welding current remains constant at 14.0 kA as shown in FIG. 2.

Then, the controller 52 commands the welding current to cease upon the expiration of the welding time interval at point E', which is 200 ms after the welding cycle begins at point B' as per the example experimental validation of the present invention. Simultaneously, the controller 52 commands the servomotor 36 to reverse so as to reduce the clamping force on the sheet-to-tube assembly 12 over a fifth clamping time interval from point E to point F, such as an 80 ms holding or cooling cycle, after which the traversable electrode 28 disengages from the sheet 14 at point F.

The clamping force levels are predetermined based on the selected materials being welded and based on the thicknesses of those materials and are optimized to reduce incidences of crack formation at or near the weld site. In the experimental validation discussed herein, the optimum force levels were 350 lbs and 200 lbs for the 1.0 mm galvanized steel sheet and 1.5 mm thick wall of galvanized steel tube. It is contemplated however, that different materials and different material thicknesses would necessitate reasonable experimentation to develop optimum force levels.

The experimental validation of the present invention revealed a marked reduction in electrode indentation marks at the faying surfaces 18, 20 of the sheet-to-tube assembly 12. This is indicative of a commensurate reduction in deflection of the sheet 14 and adjacent wall 22 of the tube 16, which in turn is indicative of less tensile stress at the weld site which yields less cracking at the weld site. In accordance with the experimental validation, a control sample was tested in which the same materials were welded with the same welding apparatus and weld schedule, except that a constant clamping force of 350 lbs was applied from the beginning of the welding cycle until the end of the hold cycle. In contrast, a present invention sample was prepared according to the disclosure herein. After the experimental welding was conducted, the welded sheet-to-tube assemblies were cross-sectioned and the indentation marks measured. The indentation marks for the control sample revealed a deflection of the sheet in the amount of 0.43 mm and a deflection of the adjacent wall of the tube in an amount of 0.52 mm. In contrast, the indentation marks of the invention sample revealed a deflection in the sheet of 0.28 mm and a deflection of the adjacent wall of the tube of 0.44 mm. Accordingly, the method of the present invention reduces part deflection by an average of about 25%. This reduction in part deflection, and associated tensile stress, appears to minimize if not eliminate cracking at the weld joint. The cross-section of the control sample revealed substantial cracking on either side of the weld nugget within the sheet material. In contrast, the cross-section of the present invention sample revealed no cracking.

In an alternative embodiment, the welding schedule may be altered so as to provide and maintain a third force level during the hold cycle and after the weld cycle is complete. As an example, during the welding cycle the first force level could be set to 400 lbs, followed by a reduced, second force level of 300 lbs. Upon termination of the welding cycle, the clamping force could be reduced over the fifth clamping time interval to the third force level of, for example 200 lbs. Thereafter, and before the traversable electrode is disengaged from the assembly, the third force level could be maintained over a brief sixth clamping time interval to hold the sheet to the tube while the molten weld nugget cools and solidifies. Preferably, the brake of the servomotor would be applied as the clamping force reaches the second force level and the third force level so as to counteract the momentum of the electrode.

The method of the present invention may be performed as a computer program and the various instruction, signals, commands, or functions may be stored in memory as a look-up table or the like. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the graphics display classes, their extensions, or document-producing programs on a CD ROM or via Internet download. In a sense, the Internet itself, as an abstract entity, is a computer readable medium. The same is true of computer networks in general. It is therefore to be understood that the method of the present invention may be performed by any electronic device capable of executing any of the above-described functions.

It should be understood that the invention is not limited to the embodiments that have been illustrated and described herein, but that various changes may be made without departing from the spirit and scope of the invention. For example, other welding gun apparatuses could be used with the method of the present invention and might include different powertrain devices to drive and retract the traversable electrode. Moreover, the experimental validation of the present invention was presented for exemplary purposes only. Those skilled in the art will recognize that welding process parameters are component design and material specific and require experimentation on a case-by-case basis to develop optimal welding results for a particular design. Accordingly, it is intended that the invention not be limited to the disclosed embodiments, but that it have the full scope permitted by the language of the following claims.

The invention claimed is:

1. A method of forming a spot weld between a steel sheet and a steel tube, said method using a spot weld electrode driven by a servomotor and using a counter electrode, said method comprising:

applying said spot weld electrode to said sheet at said spot weld site and said counter electrode to said tube;

passing a welding current between said electrodes for a time interval for forming said spot weld;

advancing said servomotor to apply a first force level to said sheet during a first portion of said time interval; and reversing said servomotor to apply a second force level to said sheet, lower than said first force level, during the remainder of said time interval, the welding current remaining the same during said time interval.

2. The method as recited in claim 1 comprising predetermining said first and second force levels based on the respective thicknesses of said sheet and tube for reducing the incidence of crack formation in said spot weld.

3. The method as recited in claim 1 comprising further reversing said servomotor to apply a third force level after said time interval of welding current flow during cooling of said spot weld.

4. A method of repeatedly forming spot welds between assemblies comprising a galvanized steel sheet workpiece having a sheet thickness and a galvanized steel tube with a tube thickness, said spot welds being formed using a spot weld electrode driven by a servomotor and using a counter electrode, said method comprising:

predetermining for said sheet and tube thicknesses a first force level during a first time interval of weld current application and a second lower force level for a second time interval of weld current application for crack-free formation of said spot welds, and thereafter during the welding of said assemblies;

applying said spot weld electrode to said sheet at a spot weld site and said counter electrode to said tube;

passing a welding current between said electrodes for a time interval substantially equivalent to the sum of said first and second time intervals, the welding current remaining the same during the first and second time intervals;

advancing said servomotor to apply said first force level to said sheet during said first time interval; and reversing said servomotor to apply said second force level to said sheet during said second time interval.

5. The method as recited in claim 4 comprising further reversing said servomotor to apply a third force level after said time interval of welding current flow during cooling of said spot weld.

6. A method of electrical resistance spot welding a steel sheet to a steel tube for an automotive vehicle structure, at least one of said tube and sheet having a galvanized coating at a spot weld site, said method comprising:

overlapping faying surfaces of said sheet and said tube to establish a sheet-to-tube assembly;

positioning said sheet-to-tube assembly between opposed welding electrodes;

driving a traversable electrode of said opposed welding electrodes against said sheet to initiate a clamping force on said sheet-to-tube assembly between said opposed welding electrodes;

increasing said clamping force to a first force level over a first clamping time interval;

applying a welding current through said opposed welding electrodes to melt portions of said sheet and said tube together for a welding time interval;

maintaining said clamping force at said first force level for a second clamping time interval;

reducing said clamping force from said first force level to a second force level over a third clamping time interval;

maintaining said clamping force at said second force level for a fourth clamping time interval;

removing said welding current upon expiration of said welding time interval;

reducing said clamping force from said second force level over a fifth clamping time interval; and disengaging said traversable electrode from said sheet-to-tube assembly.

7. The method as recited in claim 6 wherein said step of driving said traversable electrode is accomplished with a drive train driven by a servomotor having a brake.

8. The method as recited in claim 7, further comprising applying said brake upon reaching said first and second force levels so as to impede the inertia of said traversable electrode.

9. The method as recited in claim 6 wherein said step of applying said welding current occurs substantially simultaneously with reaching said first force level.

10. The method as recited in claim 6 wherein said step of reducing said clamping force occurs substantially simultaneously with said step of removing said welding current.

11. The method as recited in claim 6 wherein said second clamping time interval is about one half of said welding time interval, said fourth clamping time interval is about one half of said welding time interval, and said third clamping time interval is equal to the difference between the welding time interval and the sum of the second and fourth clamping time intervals.

12. The method as recited in claim 11, wherein said welding time interval is about 200 ms and said second and fourth clamping time intervals are each about 100 ms.

13. The method as recited in claim 11, wherein said welding time interval is about 12 cycles and said second and fourth clamping time intervals are each about 6 cycles.

14. The method as recited in claim 6 wherein said second force level is greater than half of said first force level.

15. The method as recited in claim 14 wherein said first force level is about 350 lbs and said second force level is about 200 lbs.

16. The method as recited in claim 15 wherein said welding current is about 14.5 kiloamperes.

17. The method as recited in claim 6 wherein said first clamping time interval is about 100 ms and said fifth clamping time interval is about 80 ms.

18. The method as recited in claim 6 wherein said step of reducing said clamping force from said second force level includes, upon termination of said welding time interval, reducing said clamping force to a third force level over said fifth clamping time interval and said method further comprises maintaining said clamping force at said third force level over a sixth clamping time interval before said step of disengaging said traversable welding electrode.

* * * * *